US012219336B2

(12) United States Patent
Jenkins

(10) Patent No.: US 12,219,336 B2
(45) Date of Patent: Feb. 4, 2025

(54) SEALED DUAL MEMBRANE STRUCTURE AND DEVICE INCLUDING THE SAME

(71) Applicant: AAC ACOUSTIC TECHNOLOGIES (SHENZHEN) CO., LTD., Shenzhen (CN)

(72) Inventor: Colin Robert Jenkins, Eb (GB)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 191 days.

(21) Appl. No.: 17/993,800

(22) Filed: Nov. 23, 2022

(65) Prior Publication Data

US 2024/0171913 A1 May 23, 2024

(51) Int. Cl.

*H04R 7/06* (2006.01)
*H04R 1/04* (2006.01)
*H04R 7/16* (2006.01)
*H04R 19/04* (2006.01)

(52) U.S. Cl.

CPC ................. *H04R 7/06* (2013.01); *H04R 1/04* (2013.01); *H04R 7/16* (2013.01); *H04R 19/04* (2013.01); *H04R 2307/023* (2013.01)

(58) Field of Classification Search

CPC ... H04R 7/06; H04R 1/04; H04R 7/16; H04R 19/04; H04R 2307/023; H04R 19/005; H04R 7/02; H04R 31/00; B81C 1/00158; B81B 3/0021

See application file for complete search history.

(56) References Cited

U.S. PATENT DOCUMENTS

| | | | | |
|---|---|---|---|---|
| 11,405,737 | B2 * | 8/2022 | Meng | B81C 1/00158 |
| 2016/0066099 | A1 * | 3/2016 | Dehe | H04R 31/00 381/174 |
| 2018/0091906 | A1 * | 3/2018 | Khenkin | H04R 19/04 |
| 2018/0146296 | A1 * | 5/2018 | Meisel | H04R 19/005 |
| 2019/0098418 | A1 * | 3/2019 | Hermes | H04R 19/04 |
| 2020/0204925 | A1 * | 6/2020 | Zou | H04R 7/02 |
| 2020/0213775 | A1 * | 7/2020 | Meng | B81B 3/0021 |
| 2022/0201398 | A1 * | 6/2022 | Fueldner | H04R 19/005 |
| 2022/0210580 | A1 * | 6/2022 | Guo | H04R 7/06 |
| 2023/0192473 | A1 * | 6/2023 | Wang | H04R 19/005 257/416 |

* cited by examiner

*Primary Examiner* — Angelica M McKinney
(74) *Attorney, Agent, or Firm* — W&G Law Group

(57) ABSTRACT

Provided is a sealed dual membrane (SDM) structure and a device including the same. The SDM structure according to the present invention includes a substrate, a first vibrating membrane and a second vibrating membrane disposed on the substrate, which form a sealed cavity together with the substrate, a first back electrode plate and a second back electrode plate disposed between the vibrating membrane and the second vibrating membrane, and a conductor plate unit disposed between the first back electrode plate and the second back electrode plate. The first vibrating membrane and the second vibrating membrane are mechanically coupled to the conductor plate unit, and the conductor plate unit forms a capacitor structure with each of the first back electrode plate and the second back electrode plate. The present invention reduces the number of pillars required in the SDM structure and increases the sensitivity of the device including the SDM.

16 Claims, 1 Drawing Sheet

SEALED DUAL MEMBRANE STRUCTURE AND DEVICE INCLUDING THE SAME

TECHNICAL FIELD

The present invention relates to the field of acoustic-electronics, and in particular to a sealed dual membrane (SDM) structure and a device including the same.

BACKGROUND

Some companies, such as Infineon, have developed a sealed dual membrane (SDM) technology and many devices using the SDM technology, such as a microphone. However, the reduced pressure in the device causes the dual membranes to collapse towards the centre. This is rectified by a series of pillars disposed between the dual membranes to prevent the collapse. However, these pillars for preventing the collapse in turn stiffen the dual membranes, reducing the sensitivity of the device. If there are not enough pillars between the dual membranes, stress concentrations would be created, which may lead to the failure of the device. However, more pillars would further reduce the sensitivity of the device. Thus, the number of the pillars disposed between the dual membranes becomes an important factor affecting the stiffness of the dual membranes for preventing the collapse and the sensitivity of the device.

SUMMARY

In view of the above, the present invention provides a novel sealed dual membrane (SDM) structure and a device including the same.

In an embodiment, the present invention provides a sealed dual membrane (SDM) structure, comprising a substrate, a first vibrating membrane and a second vibrating membrane disposed on the substrate, the first vibrating membrane, the second vibrating membrane and the substrate together forming a sealed cavity; a first back electrode plate and a second back electrode plate disposed between the vibrating membrane and the second vibrating membrane, and a conductor plate unit disposed between the first back electrode plate and the second back electrode plate; wherein the first vibrating membrane and the second vibrating membrane are mechanically coupled to the conductor plate unit, and wherein the conductor plate unit forms a capacitor structure with each of the first back electrode plate and the second back electrode plate.

As an improvement, each of the first back electrode plate and the second back electrode plate has a conductive layer and at least one insulator layer facing the conductor plate unit.

As an improvement, the first vibrating membrane and the second vibrating membrane are mechanically coupled to the conductor plate unit by means of a plurality of pillars.

As an improvement, the first vibrating membrane and the second vibrating membrane are configured to transfer a mechanical pressure to the conductor plate unit by means of the plurality of pillars, and the conductor plate unit is configured to receive the mechanical pressure and outputs an electrostatic signal by means of the capacitor structure.

As an improvement, the plurality of pillars comprise a plurality of first pillars and a plurality of second pillars, the plurality of first pillars are coupled to the first vibrating membrane and the conductor plate unit at two ends thereof, respectively, and the plurality of second pillars are coupled to the second vibrating membrane and the conductor plate unit at two ends thereof, respectively.

As an improvement, the first back electrode plate is provided with a plurality of first through holes, the second back electrode plate is provided with a plurality of second through holes.

As an improvement, each of the plurality of first pillars passes through one of the plurality of first through holes, each of the plurality of second pillars passes through one of the plurality of second through holes, and the first pillars and the second pillars are aligned with each other on two opposite sides of the conductor plate unit.

As an improvement, the conductor plate unit is composed of a plurality of conductor plates spaced from each other with a clearance, and each of the plurality of conductor plates is coupled to one of the first pillars and one of the second pillars, which are aligned with each other, at two sides thereof, respectively.

As an improvement, the conductor plate unit is an integral conductor plate provided with a plurality of third through holes.

As an improvement, each of the first pillars has a conductive path on one side facing the conductor plate unit and is insulating on another side facing away from the conductor plate unit, and the electrical signal can be output from the conductor plate unit by means of the conductive path and metal tracks provided on a surface of the first vibrating membrane.

As an improvement, each of the second pillars has a conductive path on one side facing the conductor plate unit and is insulating on another side facing away from the conductor plate unit, and the electrical signal can be output from the conductor plate unit by means of the conductive path and metal tracks provided on a surface of the first vibrating membrane.

As an improvement, the first pillars and the second pillars are made of an insulating material.

As an improvement, the SDM structure further comprises a conductive member connected to the conductor plate unit, thereby providing a conductive path for outputting the electrical signal from the conductor plate unit.

As an improvement, the conductive member is at least in part disposed within each of the first pillars or each of the second first pillars.

As an improvement, the first vibrating membrane and the second vibrating membrane are made of silicon nitride, polysilicon, silicon oxide, or silicon carbide.

In an embodiment, the present invention provides a device comprising the SDM structure as described above.

As an improvement, the device is a microphone.

The present invention can reduce the number of pillars required in the SDM structure and increase the sensitivity of the device including the SDM.

BRIEF DESCRIPTION OF DRAWINGS

The description of embodiments will be described below with reference to the accompanying drawings, which constitute a part of the description.

DESCRIPTION OF EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the drawings and embodiments. It should be understood the specific embodiments described hereby are only to explain the disclosure, but not intended to limit the disclosure.

It should be noted that the relative arrangement, numerical expressions and numerical values of the components set forth in these embodiments do not limit the scope of the present invention unless otherwise specified.

The following description of at least one exemplary embodiment is merely illustrative and is in no way intended as a limitation to the present invention and its application or use.

Techniques and devices known to those of ordinary skill in the art may not be discussed in detail, but where appropriate, the techniques and devices should be considered as part of the description.

The terms used in the embodiments of the present invention are only for the purpose of describing the specific embodiments, but are not intended to limit the present invention. The singular form of "a/an", "said" and "the" used in the embodiments of the present invention and the appended claims are also intended to include plural forms, unless otherwise specified. The wordings of "first" or "second" used herein are not intended to limit the present invention, and can be replaced with each other to illustrate the components as described.

In an embodiment according to the present invention, a SDM structure includes a substrate and dual membranes formed on the substrate. The dual membranes and the substrate together form a sealed cavity. Two back electrode plates are disposed between the dual membranes within the sealed cavity. A conductor plate unit is provided between the two back electrode plates within the sealed cavity. The dual membranes are mechanically coupled to the conductor plate, for example, by means of a plurality of pillars, the conductor plate forms a capacitor structure with each of the back electrode plates.

Figure 1:
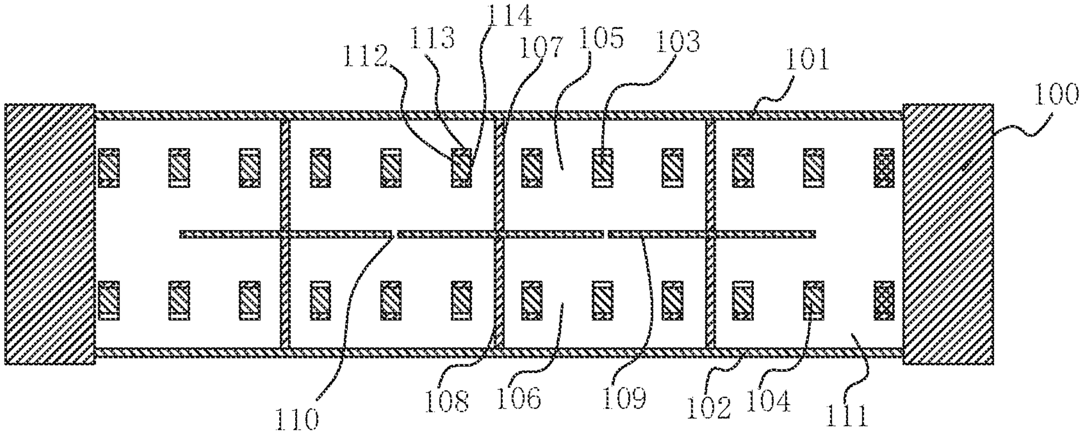
FIG. 1 illustrates a schematic cross section of a SDM structure according to an embodiment of the present invention.

As an example, FIG. 1 illustrates a schematic cross section of a SDM structure according to an embodiment of the present invention.

As illustrated in FIG. 1, the SDM structure includes a substrate 100, a first vibrating membrane 101, a second vibrating membrane 102, a first back electrode plate 103, a second back electrode plate 104, and a conductor plate unit 109.

The first vibrating membrane 101, the second vibrating membrane 102, the first back electrode plate 103, and the second back electrode plate 104 may be formed on the substrate 100 by means of, for example, deposition and/or etching. The first vibrating membrane 101, the second vibrating membrane 102, the first back electrode plate 103, and the second back electrode plate 104 are insulated from the substrate 100. Insulating layers may be disposed in positions where the membranes or the back electrode palates are contacted with the substrate 100 in order to ensure the insulation therebetween.

A sealed cavity 111 is defined by the first vibrating membrane 101, the second vibrating membrane 102, and the substrate 100. The sealed cavity 111 is manufactured by the well-known methods in the art, such as the conventional deposition and etching. The sealed cavity 111 may be filled with a gas whose viscosity coefficient is smaller than that of air, such as hydrogen. In an embodiment, the pressure required in the sealed cavity 111 is much less than 0.5 atmospheres.

As also illustrated in FIG. 1, the first back electrode plate 103 and the second back electrode plate 104 is disposed between the first vibrating membrane 101 and the second vibrating membrane 102. The conductor plate unit 109 is disposed between the first back electrode plate 103 and the second back electrode plate 104.

In an embodiment, each of the first back electrode plate 103 and the second back electrode plate 104 has a conductive layer and at least one insulator layer facing the conductor plate unit 109.

In an embodiment, each of the first back electrode plate 103 and the second back electrode plate 104 has a conductive layer and two insulator layer disposed on two opposite sides of the conductive layer.

In an embodiment, the first back electrode plate 103 and the second back electrode plate 104 may share a single conductive layer.

As an example, FIG. 1 illustrates that each of the first back electrode plate 103 and the second back electrode plate 104 has a conductive layer 112 and two insulator layers 113 and 114 at two opposite sides of the conductive layer 112.

Still referring to FIG. 1, the first electrode plate 103 is provided with a plurality of first through holes 105, which are uniformly distributed in the first electrode plate 103. The second electrode plate 104 is provided with a plurality of second through holes 106, which are uniformly distributed in the second electrode plate 104. The first through holes 105 and the second through holes 106 are aligned with each other.

As illustrated in FIG. 1, the plurality of pillars comprise a plurality of first pillars 107 and a plurality of second pillars 108. Each of the plurality of first pillars 107 passes through one of the plurality of first through holes 105, and each of the plurality of second pillars 108 passes through one of the plurality of second through holes 106.

The plurality of first pillars 107 are coupled to the first vibrating membrane 101 and the conductor plate unit 109 at two ends thereof, respectively. The plurality of second pillars 108 are coupled to the second vibrating membrane 102 and the conductor plate unit 109 at two ends thereof, respectively. The plurality of first pillars 107 are aligned with the plurality of second pillars 108 at two opposite sides of the conductor plate 109.

In an embodiment, the first vibrating membrane 101 and the second vibrating membrane 102 are configured to transfer a mechanical pressure to the conductor plate unit 109 by means of the plurality of first pillars 107 and the plurality of pillars 108.

In an embodiment, the first vibrating membrane 101 and the second vibrating membrane 102 are merely used for mechanical pressure transduction.

The conductor plate unit 109 forms a capacitor structure with each of the first back electrode plate 103 and the second back electrode plate 104. The conductor plate unit 109 is configured to receive the mechanical pressure from the first back electrode plate 103 and the second back electrode plate 104 and outputs an electrical signal by means of the capacitor structure which is formed by the conductor plate unit 109 and one of the first back electrode plate 103 and the second back electrode plate 104.

More specifically, the first vibrating membrane 101 and the second vibrating membrane 102 absorb a pressure and turn it into a mechanical movement. This mechanical movement is transferred to the conductor plate unit 109, which is mechanically coupled to the first vibrating membrane 101 and the second vibrating membrane 102 by means of the plurality of pillars, thereby causing the conductor plate unit 109 to move relative to the first back electrode plate 103 and the second back electrode plate 104. This relative movement of the conductor plate unit 109 in turn causes a change in capacitance of the formed capacitor structure, and thus outputs an electrical signal (such as an electrostatic signal).

In an embodiment, the conductor plate unit 109 is composed of a plurality of conductor plates spaced from each other with clearances, and each of the plurality of conductor plates is coupled to each of the first pillars 107 and each of the second pillars 108 at two sides thereof, respectively, as shown in FIG. 1. There may be 10 to 200 conductor plates between the first back electrode plate 103 and the second back electrode plate 104 in a SDM structure.

In an embodiment, the conductor plate unit 109 may be an integral conductor plate provided with a plurality of third through holes 110. The integral conductor plate may be divided into 10 to 200 sub-plates by the plurality of third through holes 110.

The pressure in the sealed cavity 111 may be maintained uniform by means of the first and second through holes 105, 106, and the third through holes 110.

Materials used in the SDM will be simply introduced below.

The substrate 100 may be made of a material such as single crystal silicon.

In an embodiment according to the present invention, the first and second vibrating membranes 101, 102 may be made of silicon nitride, which has a higher fracture strength to strengthen the first and second vibrating membranes 101, 102. Therefore, the stiffness of the vibrating membranes may be increased without reducing the sensitivity of the SDM structure.

In other embodiments according to the present invention, the first and second vibrating membranes 101, 102 may be made of other suitable materials, such as polysilicon, silicon oxide, silicon carbide or other common MEMS materials.

As aforementioned, each of the first and second back electrode plates 103, 104 have a conductive layer and at least one insulator layer. As an example, the conductive layer may be made of polysilicon, and the at least one insulator layer may be made of silicon nitride. The at least one insulator layer may be disposed on the conductive layer, for example, by means of deposition.

The conductor plate unit 109 may be made of any suitable conductive material, such as polysilicon.

The deposition or etching processes as mentioned herein are well known to those skilled in the art and thus will not be described in detail herein.

In an embodiment, the first pillars 107 and the second pillars 108 may be made of silicon oxide.

In an embodiment, the first pillars 107 and the second pillars 108 may also be constructed using any of the other layers in the process stack. For example, the first pillars 107 and the second pillars 108 may contain metal, polysilicon, silicon nitride, or other material commonly used in MEMS.

In an embodiment, the first pillars 107 or the second pillars 108 may have a conductive path on one side facing the conductor plate unit 109 for outputting the electrical signal, and largely insulating on the other side. In addition, metal tracks may be provided on a surface of the first or second vibrating membranes 101, 102. Thus, the electrical signal can be output from the conductor plate unit 109 by means of the conductive path in the first or second pillars 107, 108 and the metal tracks on the surface of the first or second vibrating membranes 101, 102.

When the pressure of the external environment changes and the pressure in the sealed cavity 111 is reduced, the pressure difference between the sealed cavity 111 and the external environment may cause the first and second vibrating membranes 101 and 102 to collapse towards the centre. The plurality of first pillars 107 and second pillars 108 supported between the first and second vibrating membranes 101 and 102 may prevent the collapse. However, in the related art, more pillars would stiffen the outer diaphragms for the function of capacitive sensing, which in turn reduces the sensitivity of a microphone including the SDM structure. In the present invention, as aforementioned, the first and second vibrating membrane 101, 102 are configured to have a higher fracture strength to strengthen the first and second membranes 101, 102. Thus, in an embodiment according to the present invention, the pillars can be further apart from each other, so that the number of the pillars required in the SDM structure is reduced and the sensitivity of the microphone is increased.

Figure 2:
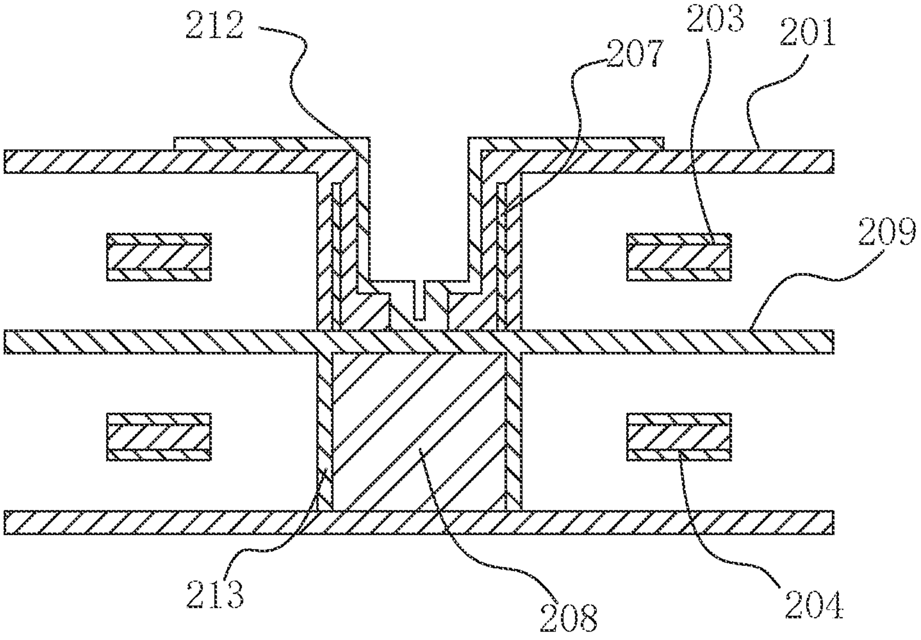
FIG. 2 illustrates a schematic partial cross section of pillars in a SDM structure according to an embodiment of the present invention.

FIG. 2 illustrates a partial cross section of pillars according to an embodiment of the present invention.

In an embodiment as illustrated in FIG. 2, a SDM structure includes a first vibrating membrane 201, a plurality of first pillars 207, a plurality of second pillars 208, and a conductive member 212. It should be understood that the other elements included in the SDM structure as illustrated in FIG. 2, such as a second vibrating membrane 202, a conductor plate unit 209, a first back electrode plate 203, and a second back electrode plate 204 etc. are the same as those included in the SDM structure as shown in FIG. 1, and thus will not be described in detail herein.

In an embodiment, the conductive member 212 may be a metal member and connected to the conductor plate unit 209, thereby providing a conductive path for outputting an electrical signal from the conductor plate unit 209. As illustrated in FIG. 2, the conductive member 212 is at least in part embed within the first pillar 207.

In an embodiment, the first pillar 207 and the second pillar 208 may be made of insulation materials such as silicon oxide or silicon nitride, or may be made of less conductive materials such as undoped polysilicon, or also doped polysilicon that is electrically isolated from conductive paths.

As illustrated in FIG. 2, the first pillar 207 may be integrated with the first vibrating membrane 201. The first pillar 207 may contain silicon nitride and a layer of silicon oxide 215 encapsulated by silicon nitride, which may be implemented by using a common MEMS technique.

The second pillar 208 may be made of silicon oxide.

In an embodiment, the second pillar 208 may contain silicon oxide and a layer of polysilicon/silicon nitride 213 surrounding the silicon oxide, as shown in FIG. 2. The layer of polysilicon/silicon nitride 213 may be made of silicon nitride or the like. The layer of polysilicon/silicon nitride 213 may prevent release of the silicon oxide and give the second pillars more mechanical strength, thereby further reducing the number of the required pillars in the SDM structure. In other embodiment, the layer of polysilicon/silicon nitride 213 may be deposited together with the conductor plate unit 209. As a result, the layer of polysilicon/silicon nitride 213 and the conductor plate unit 209 may be located in the same layer.

Encapsulating silicon oxide in the first pillar 207 or the second pillar 208 may be implemented by using a common MEMS technique, which, for example, includes etching a narrow slit in the sacrificial material, allowing the next layer to conformally enter that slit to seal off part of the sacrificial material, thereby isolating it from the release process. This technique can help to create mechanical strength in edge structures where otherwise the side walls would be very narrow and brittle.

In an embodiment, the first pillar 207 or the second pillar 208 may also give a conductive path from the conductor plate unit 209 to the first vibrating membrane 201 or the second vibrating membrane 202. Thus, the first pillar 207 or the second pillar 208 may use a number of different conductive and insulator layers to form the mechanical and electrical functionality.

In an embodiment according to the present invention, a device including the SDM structure as shown in FIG. 1 or FIG. 2 is provided. In an embodiment, the device may be a microphone.

The above embodiments of the present invention are illustrative and not limitative. Other additions, subtractions or modifications are obvious in view of the present invention and are intended to fall within the scope of the present invention.

What is claimed is:

1. A sealed dual membrane (SDM) structure, comprising:

a substrate;

a first vibrating membrane and a second vibrating membrane disposed on the substrate, the first vibrating membrane, the second vibrating membrane and the substrate together forming a sealed cavity;

a first back electrode plate and a second back electrode plate disposed between the first vibrating membrane and the second vibrating membrane, and a conductor plate unit disposed between the first back electrode plate and the second back electrode plate;

wherein the first vibrating membrane and the second vibrating membrane are mechanically coupled to the conductor plate unit, and wherein the conductor plate unit forms a capacitor structure with each of the first back electrode plate and the second back electrode plate; each of the first back electrode plate and the second back electrode plate has a conductive layer and at least one insulator layer facing the conductor plate unit.

2. The SDM structure as described in claim 1, wherein the first vibrating membrane and the second vibrating membrane are mechanically coupled to the conductor plate unit by means of a plurality of pillars.

3. The SDM structure as described in claim 2, wherein the first vibrating membrane and the second vibrating membrane are configured to transfer a mechanical pressure to the conductor plate unit by means of the plurality of pillars, and the conductor plate unit is configured to receive the mechanical pressure and outputs an electrostatic signal by means of the capacitor structure.

4. The SDM structure as described in claim 3, wherein the conductor plate unit is an integral conductor plate provided with a plurality of third through holes.

5. The SDM structure as described in claim 3, wherein the plurality of pillars are made of an insulating material.

6. The SDM structure as described in claim 2, wherein the plurality of pillars comprise a plurality of first pillars and a plurality of second pillars, and wherein the plurality of first pillars are coupled to the first vibrating membrane and the conductor plate unit at two ends thereof, respectively, and the plurality of second pillars are coupled to the second vibrating membrane and the conductor plate unit at two ends thereof, respectively.

7. The SDM structure as described in claim 6, wherein the first back electrode plate is provided with a plurality of first through holes, the second back electrode plate is provided with a plurality of second through holes.

8. The SDM structure as described in claim 7, wherein each of the plurality of first pillars passes through one of the plurality of first through holes, each of the plurality of second pillars passes through one of the plurality of second through holes, and the first pillars and the second pillars are aligned with each other on two opposite sides of the conductor plate unit.

9. The SDM structure as described in claim 6, wherein the conductor plate unit is composed of a plurality of conductor plates spaced from each other with a clearance, and each of the plurality of conductor plates is coupled to one of the first pillars and one of the second pillars, which are aligned with each other, at two sides thereof, respectively.

10. The SDM structure as described in claim 6, wherein each of the first pillars has a conductive path on one side facing the conductor plate unit and is insulating on another side facing away from the conductor plate unit, and the electrostatic signal can be output from the conductor plate unit by means of the conductive path and metal tracks provided on a surface of the first vibrating membrane.

11. The SDM structure as described in claim 6, wherein each of the second pillars has a conductive path on one side facing the conductor plate unit and is insulating on another side facing away from the conductor plate unit, and the electrostatic signal can be output from the conductor plate unit by means of the conductive path and metal tracks provided on a surface of the second vibrating membrane.

12. The SDM structure as described in claim 11, wherein the SDM structure further comprises a conductive member connected to the conductor plate unit, thereby providing a conductive path for outputting the electrical signal from the conductor plate unit.

13. The SDM structure as described in claim 11, wherein the conductive member is at least in part disposed within each of the first pillars or each of the second first pillars.

14. The SDM structure as described in claim 1, where the first vibrating membrane and the second vibrating membrane are made of silicon nitride, polysilicon, silicon oxide, or silicon carbide.

15. A device, comprising the SDM structure as described in claim 1.

16. The device as described in claim 15, wherein the device is a microphone.

* * * * *